(12) United States Patent
Seo et al.

(10) Patent No.: US 8,709,678 B2
(45) Date of Patent: Apr. 29, 2014

(54) METAL-DOPED OXIDE, METHOD OF PREPARING THE SAME, AND SOLID OXIDE ELECTROLYTE USING THE METAL-DOPED OXIDE

(75) Inventors: Soo-yeon Seo, Seoul (KR); Hee-jung Park, Suwon-si (KR); Chan Kwak, Yongin-si (KR); Sang-mock Lee, Yongin-si (KR); Dong-hee Yeon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 527 days.

(21) Appl. No.: 13/010,322

(22) Filed: Jan. 20, 2011

(65) Prior Publication Data

US 2011/0236795 A1    Sep. 29, 2011

(30) Foreign Application Priority Data

Mar. 24, 2010    (KR) ........................ 10-2010-0026401

(51) Int. Cl.
*H01M 8/00* (2006.01)
(52) U.S. Cl.
USPC ............................ 429/496; 429/495; 429/491
(58) Field of Classification Search
USPC .......................................... 429/496, 495, 491
See application file for complete search history.

(56) References Cited

U.S. PATENT DOCUMENTS

| | | | |
|---|---|---|---|
| 4,857,165 A | | 8/1989 | Ishiguro et al. |
| 5,607,892 A | * | 3/1997 | Chopin et al. ................. 502/304 |
| 6,040,265 A | * | 3/2000 | Nunan ........................... 502/242 |
| 8,343,286 B2 | * | 1/2013 | Neplenbroek et al. ....... 134/25.2 |
| 2006/0120951 A1 | * | 6/2006 | Takao et al. ................... 423/608 |
| 2007/0026285 A1 | | 2/2007 | Wang et al. |

FOREIGN PATENT DOCUMENTS

| | | |
|---|---|---|
| JP | 1993-116939 A | 5/1993 |
| JP | 2001-031424 A | 2/2001 |
| JP | 2001-039716 A | 2/2001 |
| JP | 2008-22662 A | 9/2008 |
| KR | 1019960004289 A | 2/1996 |
| KR | 1020040024287 A | 3/2004 |
| KR | 1020040077081 A | 9/2004 |
| KR | 1020050052351 A | 6/2005 |

OTHER PUBLICATIONS

Chen et al., "Influence of microstructure on the ionic conductivity of yttria-stabilized zirconia electrolyte", Materials Science and Engineering, A335, 2002, pp. 246-252.

Dahl et al., "Densification and properties of zirconia prepared by three different sintering techniques", Ceramics International, 33, 2007, pp. 1603-1610.

* cited by examiner

*Primary Examiner* — Helen O Conley
(74) *Attorney, Agent, or Firm* — Cantor Colburn LLP

(57) ABSTRACT

A method of preparing a metal-doped oxide, the method including: preparing a precursor solution including a zirconium precursor or cerium precursor, a dopant metal precursor, a solvent, and a chloride salt; and heat-treating the precursor solution to prepare the metal-doped oxide.

Also an oxide including: a metal-doped zirconia or metal-doped ceria; and chlorine.

9 Claims, 5 Drawing Sheets

METAL-DOPED OXIDE, METHOD OF PREPARING THE SAME, AND SOLID OXIDE ELECTROLYTE USING THE METAL-DOPED OXIDE

CROSS-REFERENCE TO RELATED APPLICATIONS

This application claims priority to Korean Patent Application No. 10-2010-0026401, filed on Mar. 24, 2010, and all the benefits accruing therefrom under 35 U.S.C. §119, the content of which in its entirety is herein incorporated by reference.

BACKGROUND

1. Field

The present disclosure relates to a metal-doped oxide, a method of preparing the same, and a solid oxide electrolyte using the metal-doped oxide.

2. Description of the Related Art

Fuel cells are an example of an alternative energy source, and can be classified as a polymer electrolyte membrane fuel cell ("PEMFC"), a phosphoric acid fuel cell ("PAFC"), a molten carbonate fuel cell ("MCFC"), or a solid oxide fuel cell ("SOFC") according to the type of electrolyte.

SOFCs include an ionically conductive solid oxide electrolyte. SOFCs can provide high efficiency, excellent durability, and relatively low manufacturing cost, and can use a variety of fuels.

An output voltage of a SOFC may be calculated using equation I below.

Equation I $$V = V_{oc} - i(R_{electrolyte} + R_{cathode} + R_{anode}) - \eta_{cathode} - \eta_{anode}$$

In equation I, V is the output voltage, $V_{oc}$ is the open circuit voltage, i is current, and $R_{electrolyte}$, $R_{cathode}$, and $R_{anode}$ are respectively the resistance of an electrolyte, a cathode, and an anode, and $\eta_{cathode}$ and $\eta_{anode}$ are the concentration polarization of the cathode and anode, respectively. In equation I, $i(R_{eleotrolyte} + R_{cathode} + R_{anode})$ is the resistance polarization.

The actual output voltage of a SOFC is lower than its theoretical output voltage because of the resistance of the solid oxide electrolyte, the negative electrode, and the positive electrode as shown in equation I above. The solid oxide electrolyte inhibits air and fuel from mixing between the negative and positive electrodes, supports the negative and positive electrodes, and allows oxygen ions to transport (i.e., diffuse) from the positive electrode to the negative electrode.

Therefore, there remains a need to reduce the resistance of the electrolyte in order to increase the output voltage of the SOFC. In other words, there remains a need for a solid oxide electrolyte having higher ionic conductivity.

SUMMARY

Provided is a method of preparing a metal-doped oxide.

Provided is an oxide including chlorine and a metal-doped zirconia or a metal-doped ceria.

Provided is a solid oxide electrolyte including a metal-doped oxide and chlorine, and a solid oxide fuel cell ("SOFC") including the solid oxide electrolyte.

Additional aspects, features, and advantages will be set forth in part in the description which follows and, in part, will be apparent from the description.

According to an aspect, a method of preparing a metal-doped oxide includes: preparing a precursor solution including a zirconium precursor or a cerium precursor, a dopant metal precursor, a solvent, and a chloride salt; and heat-treating the precursor solution to prepare the metal-doped oxide.

The chloride salt may include sodium (Na), lithium (Li), potassium (K), magnesium (Mg), or a combination including at least one of the foregoing.

An amount of the chloride salt may be of about 5 to about 10 moles, based on 1 mol of the dopant metal precursor and the zirconium precursor or the cerium precursor. In an embodiment, the molar ratio of the dopant metal precursor and the zirconium precursor or cerium precursor to the chloride salt may be about 1:5 to about 1:10.

The heat-treating may be performed at a temperature of about 600 to about 900° C.

The zirconium precursor may be zirconium acetate, zirconium nitrate, or a combination including at least one of the foregoing, and the cerium precursor may be cerium acetate, cerium nitrate, cerium chloride, or a combination including at least one of the foregoing.

The dopant metal precursor may include yttrium (Y), scandium (Sc), ytterbium (Yb), gadolinium (Gd), samarium (Sm), indium (In), lutetium (Lu), dysprosium (Dy), lanthanum (La), bismuth (Bi), praseodymium (Pr), actinium (Ac), aluminum (Al), gallium (Ga), or boron (B), or a combination including at least one of the foregoing.

The precursor solution may further include a precipitant.

The precipitant may include at least one of urea, citric acid, tartaric acid, oxalic acid, hexadecanediol, ammonia aqueous solution, hydrazine ($NH_2NH_2$) aqueous solution, acetic acid, sodium acetate, ammonium acetate, oleic acid, sodium oleate, ammonium oleate, ammonium succinate, polyacrylate, glycine, acyl glutamate, or a combination including at least one of the foregoing.

The method may further include irradiating microwaves on the precursor solution before the heat-treating the precursor solution.

According to another aspect, an oxide includes: a metal-doped zirconia or a metal-doped ceria; and chlorine.

An amount of the chlorine may be of about 0.5 to about 2 weight percent (wt %) based on a total weight of the oxide.

The metal-doped zirconia or the metal-doped ceria may be in the form of particles, and an average particle diameter of the metal-doped zirconia or the metal-doped ceria may be about 20 to about 60 nanometers (nm).

According to another aspect, provided is a solid oxide electrolyte including a metal-doped oxide; and chlorine. Also disclosed is a SOFC including the solid oxide electrolyte.

An amount of the chlorine may be about 0.5 to about 2 wt %, based on the total weight of the solid oxide electrolyte.

A relative density of the solid oxide electrolyte may be equal to or greater than 90%.

According to another aspect, a method of preparing a solid oxide electrolyte includes: sintering the oxide described above at a temperature of about 1000 to about 1600° C.

According to another aspect, provided is a SOFC including: a positive electrode; a negative electrode; and the solid oxide electrolyte described above, wherein the solid oxide electrolyte is interposed between the positive electrode and the negative electrode.

BRIEF DESCRIPTION OF THE DRAWINGS

These and/or other aspects, features, and advantages will become apparent and more readily appreciated from the following description of the embodiments, taken in conjunction with the accompanying drawings in which.

DETAILED DESCRIPTION

Figure 1A:
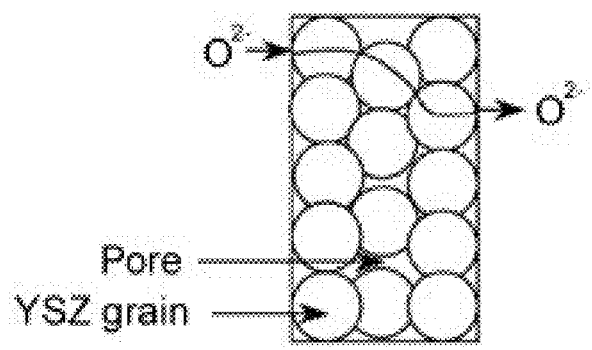
FIG. 1A is a schematic diagram which shows an embodiment of a pathway for oxygen ion migration in a solid oxide electrolyte.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1B:
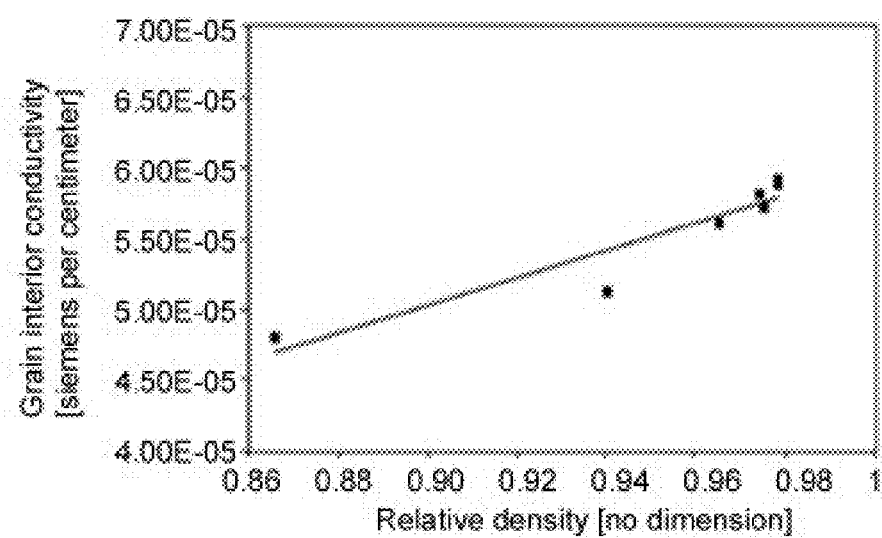
FIG. 1B is a graph of grain interior conductivity (siemens per centimeter) versus relative density (percent of theoretical density), illustrating ionic conductivity with respect to relative density of yttria-stabilized zirconia ("YSZ") powder.

The ionic conductivity of a solid oxide electrolyte in a solid oxide fuel cell ("SOFC") is influenced by the density of the solid oxide electrolyte. Referring to FIG. 1A, ions are conducted via a pathway between grains. Pores, which are formed between grains, are not conductive, and thus ionic conductivity decreases as a void content increases. For example, the ionic conductivity of yttria-stabilized zirconia ("YSZ"), which is commercially used as a solid oxide electrolyte, increases as a relative density increases, as shown in FIG. 1B. Accordingly, it is desirable to increase the density of a solid oxide electrolyte.

According to an embodiment, provided is a material for an electrolyte and a method of preparing the material in order to increase the density of the electrolyte in a SOFC.

Zirconia or ceria doped with yttrium (Y), scandium (Sc), ytterbium (Yb), gadolinium (Gd), samarium (Sm), indium (In), lutetium (Lu), dysprosium (Dy), lanthanum (La), bismuth (Bi), praseodymium (Pr), actinium (Ac), aluminum (Al), gallium (Ga), or boron (B) is used to form an electrolyte of a SOFC. A combination comprising at least one of the foregoing dopants can be used. According to an embodiment, provided is a method of preparing a metal-doped oxide, which may be used to form a solid oxide electrolyte material, and an oxide prepared using the method. Each of the zirconia, ceria, metal-doped oxide, and oxide can be in the form of particles to provide a powder comprising particles.

A method of preparing the metal-doped oxide includes: preparing a precursor solution including a zirconium precursor or a cerium precursor, a dopant metal precursor, a solvent, and a chloride salt; and heat-treating the precursor solution to prepare the metal-doped oxide. The metal-doped oxide may be in particle form.

The chloride salt may comprise at least one metal of a Group 1A or 2A element, e.g., sodium (Na), lithium (Li), potassium (K), or magnesium (Mg), wherein Group refers to a Group of the Periodic Table of the Elements. A large amount of the chloride salt may be used compared to the amount of the zirconium precursor or the cerium precursor. For example, the amount of the chloride salt may be about 2 to about 20 moles, specifically about 5 to about 10 moles, more specifically about 6 to about 9 moles, based on 1 mol of the dopant metal precursor and the zirconium precursor or the cerium precursor. For example, the amount of the chloride salt may be about 5 to about 10 moles, based on 1 mole of the dopant metal precursor and the zirconium precursor or the cerium precursor.

While not wanting to be bound by theory, it is understood that the chloride salt, when in a molten state, may function as a border between particles or grains of the zirconium precursor, or between particles or grains of the cerium precursors, thereby inhibiting the growth of particles of the oxide that result from the zirconium or cerium precursors. Thus, the oxide may have a uniform particle size (e.g., average largest particle size) of several tens to several hundred nanometers (nm), specifically about 10 to about 900 nm, more specifically about 20 to about 800 nm.

In the method, the heat-treating may be performed at a temperature of about 600 to about 900° C., specifically about 650 to about 800° C., more specifically about 700 to about 750° C.

The zirconium precursor may be zirconium nitrate, zirconium chloride, or any mixture thereof, or a combination comprising at least one of the foregoing. In addition, the cerium precursor may be cerium acetate, cerium nitrate, cerium chloride, or any mixture thereof, or a combination comprising at least one of the foregoing.

The dopant metal precursor may include at least one of yttrium (Y), scandium (Sc), ytterbium (Yb), gadolinium (Gd), samarium (Sm), indium (In), lutetium (Lu), dysprosium (Dy), lanthanum (La), bismuth (Bi), praseodymium (Pr), actinium (Ac), aluminum (Al), gallium (Ga), or boron (B). A combination comprising at least one of the foregoing can be used. For example, the dopant metal precursor may be yttrium chloride. The amount of the dopant metal precursor may be about 0.01 to about 0.5 mole, specifically about 0.05 to about 0.35 mole, more specifically about 0.1 to about 0.3 mole, based on 1 mol of the zirconium precursor or the cerium precursor.

The solvent may include at least one of water; an aliphatic mono-ol, such as methanol, ethanol, or isopropanol; an aliphatic diol, such as ethylene glycol, diethylene glycol, or propylene glycol; an aliphatic triol, such as glycerin; or a combination comprising at least one of the foregoing. The concentration of the zirconium precursor or the cerium precursor, which is added to the solvent, may be about 0.0001 to about 0.1 molar (M), specifically about 0.001 to about 0.05 M, more specifically about 0.005 to about 0.01 M.

The precursor solution may further include a precipitant, which can promote the formation of a precipitate from the precursor solution. The precipitant may be urea, citric acid, tartaric acid, oxalic acid, hexadecanediol, ammonia aqueous solution, a hydrazine ($NH_2NH_2$) aqueous solution, acetic acid, sodium acetate, ammonium acetate, oleic acid, sodium oleate, ammonium oleate, ammonium succinate, polyacrylate, glycine, acyl glutamate, or a combination comprising at least one of the foregoing. While not wanting to be bound by theory, it is believed that the precipitant promotes formation of crystal nuclei having a uniform and small size when the zirconium precursor, the cerium precursor, or the dopant metal precursor is precipitated. The amount of the precipitant may be about 1 to about 10 moles, specifically about 2 to about 4 moles, more specifically about 3 moles, based on 1 mole of the dopant metal precursor and the zirconium precursor or the cerium precursor.

The method may further include irradiating the precursor solution with microwaves before heat-treating the precursor solution. For example, the crystal nuclei may be formed and precipitated by the microwaves. Thus, while not wanting to be bound by theory, it is believed that the microwaves promote the formation of uniform crystal nuclei by forming the crystal nuclei in a short period of time. The precursor solution may be rapidly heated by direct interaction between the microwaves and the solvent and/or the other reactants, and the reaction time may be decreased due to the kinetics of the microwaves. Due to a local super heating effect, a defect on a surface of a particle, or a crystal defect may be efficiently corrected while the uniform formation of nuclei is induced. The microwaves may be electromagnetic waves having a power of about 100 to about 2000 watts (W), specifically about 400 to about 800 W, more specifically 500 to 700 W, and may be irradiated for about 1 minute to about 20 minutes, specifically about 2 minutes to about 10 minutes, more specifically about 2 minutes to about 5 minutes. Also, conditions for the microwave irradiation are not limited thereto and may be controlled if desired.

The heat-treatment may be performed at a temperature of about 600 to about 900° C., specifically about 650 to about 850° C., more specifically about 700 to about 750° C. The oxide may in the form of a particle powder. An average (e.g., average largest) particle diameter of the oxide after the heat-treatment may be about 20 to about 60 nm, specifically about 30 to about 50 nm, more specifically about 40 nm. A large amount of chlorine may be removed by cleaning the heat-treated oxide.

The oxide prepared according to the method of preparing the metal-doped oxide is an oxide doped with metal element, for example, zirconia or ceria doped with yttrium (Y), scandium (Sc), ytterbium (Yb), gadolinium (Gd), samarium (Sm), indium (In), lutetium (Lu), dysprosium (Dy), lanthanum (La), bismuth (Bi), praseodymium (Pr), actinium (Ac), aluminum (Al), gallium (Ga), or boron (B), as a dopant. A combination comprising at least one of the foregoing can be used. The oxide may further include chlorine remaining around (e.g., on the surface of) the oxide (e.g., oxide particles) to form an oxide, which may be a powder comprising particles.

In the oxide, which comprises the metal-doped zirconia or ceria and chlorine, the amount of chlorine may be about 0.1 to about 5 weight percent (wt %), specifically about 0.5 to about 2 wt %, more specifically about 1 wt %, based on the total weight of the oxide.

According to another embodiment, provided is a solid oxide electrolyte having high density and a method of preparing the solid oxide electrolyte.

Figure 2:
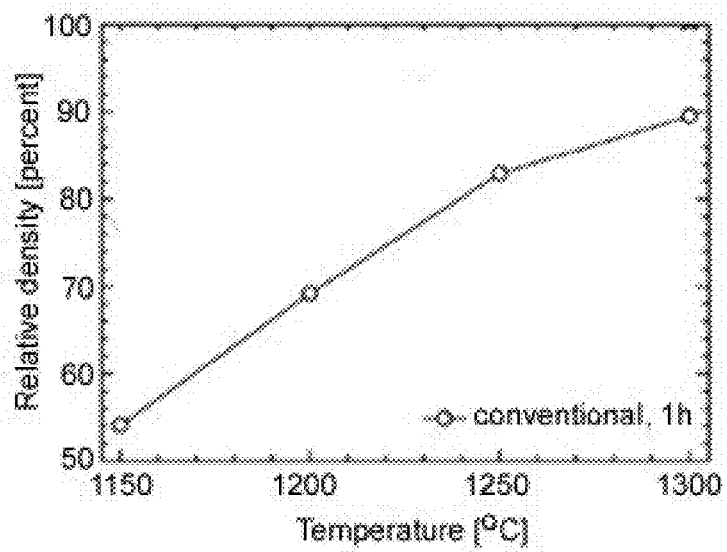
FIG. 2 is a graph of relative density (percent of theoretical density) versus temperature (degrees centigrade, ° C.) illustrating relative density with respect to a sintering temperature of an embodiment of YSZ powder.

The density of the solid oxide electrolyte may increase while it is sintered. For example, if a YSZ nano-powder is sintered, the density of the YSZ may increase according to the sintering temperature, as illustrated in FIG. 2. However, increases in the sintering temperature during the preparation of a SOFC may adversely affect the performance of some elements of the SOFC.

In general, the negative electrode reaction process may occur at a triple phase boundary ("TPB") where pores meet, wherein the pores are pathways of an electronic conductor (e.g., Ni), an ionic conductor (e.g., YSZ), and a gas (e.g., fuel). Thus, a wide TPB is effective for the negative electrode reaction process. The size of particles constituting the negative electrode should be reduced in order to enlarge the TPB, and a multi-porous structure is effective for smooth migration of gas. To provide such a structure, a low sintering temperature is understood to be effective. Thus, as the sintering temperature increases while the solid oxide electrolyte is prepared, the performance of the negative electrode may deteriorate. The performance of the negative electrode may further deteriorate when an electrode (e.g., the negative electrode) support type SOFC is prepared. An electrode (e.g., negative electrode) support type SOFC is prepared by forming a bulk material used to form a negative electrode, coating a solid oxide electrolyte material on a surface of the negative electrode, sintering the coating, coating a positive electrode material on the solid oxide electrolyte, and heat-treating the coating. The solid oxide electrolyte material may be sintered at a high temperature (e.g., about 1000° C. to about 1600° C., specifically about 1400° C.). In this regard, the growth of the electronic conductor particles (e.g., Ni) and the ionic conductor particles (e.g., YSZ) of the negative electrode is induced and the TPB may be reduced.

Figure 5:
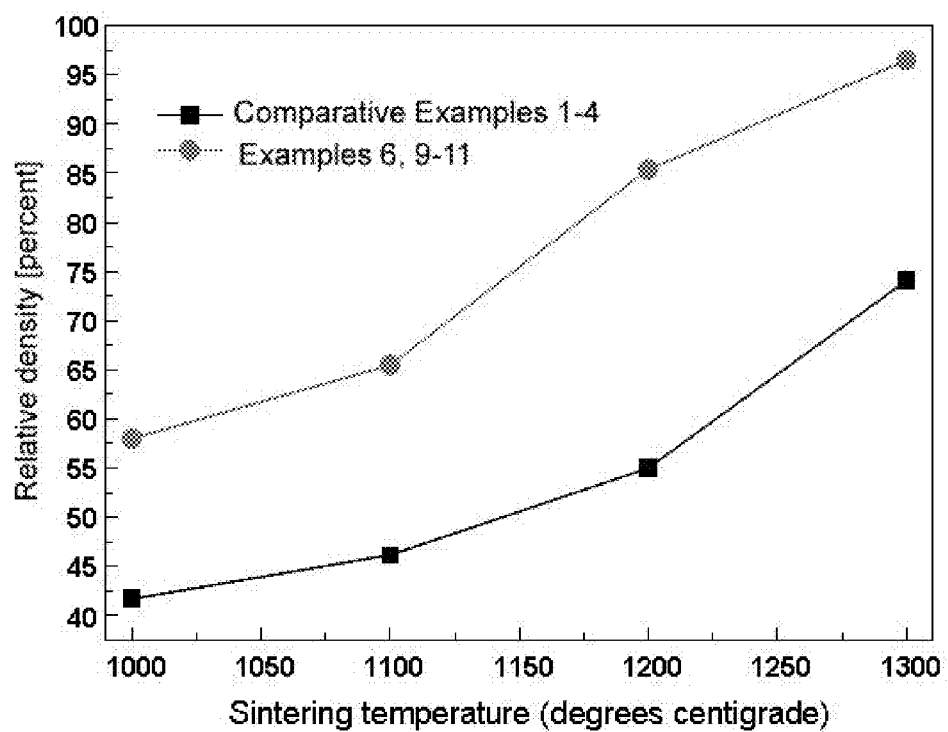
FIG. 5 is a graph of relative density (percent of theoretical density) versus sintering temperature (degrees centigrade, ° C.) illustrating relative density of pellets which were prepared according to Examples 6, 9 to 11, and Comparative Examples 1 to 4, and sintered.

If the oxide, which can comprise particles and can be in the form of a powder, is used as the solid oxide electrolyte material, an electrolyte having high density may be prepared although it is sintered at a lower sintering temperature. Because the oxide has a uniform particle size distribution, which is between several tens and several hundred nanometers, a density of the oxide may be increased during the sintering. In addition, the chlorine contained in the oxide functions as an additive for the sintering, and thus the sintering temperature may be decreased. Referring to FIG. 5, in an embodiment the oxide has density equal to or greater than commercially available electrolyte materials even when the oxide is sintered at a lower temperature than commercially available electrolyte materials.

The solid oxide electrolyte may be prepared by sintering the oxide at a temperature of about 1000 to about 1600° C., specifically about 1100 to about 1300° C., more specifically about 1200° C. The particle diameter and density of the oxide may be increased, and the amount of residual chlorine may be reduced by the heat-treatment.

The solid oxide electrolyte may include a metal-doped oxide and chlorine. The metal-doped oxide may be in the form of a particle. The metal-doped oxide contained in the solid oxide electrolyte may be present as particles sintered by the sintering process (i.e., particles bound to each other with boundaries therebetween) and have a particle size distribution of about 0.1 to about 10 μm, specifically about 1 to about 5 μm, more specifically about 2 to about 4 μm. Examples of the metal-doped oxide include zirconia or ceria comprising (e.g., doped with) yttrium (Y), scandium (Sc), ytterbium (Yb), gadolinium (Gd), samarium (Sm), indium (In), lutetium (Lu), dysprosium (Dy), lanthanum (La), bismuth (Bi), praseodymium (Pr), actinium (Ac), aluminum (Al), gallium (Ga), or boron (B), as a dopant. A combination comprising at least one of the foregoing can be used. In addition, the amount of chlorine may be about 0.1 to about 5 wt %, specifically about 0.5 to about 2 wt %, more specifically about 1 to about 1.5 wt %, based on the total weight of the solid oxide electrolyte. The solid oxide electrolyte may have a relative density of about 80 to about 99%, specifically about 90 to about 96%, more specifically about 92% to about 94% after being sintered at 1300° C.

According to another embodiment, a SOFC including the solid oxide electrolyte is provided.

The SOFC may be a unit cell or a stack of unit cells. For example, a stack of unit cells may be prepared by stacking unit cells, each including a positive electrode, a negative electrode, and a solid oxide electrolyte (to provide, in an embodiment, a membrane and electrode assembly ("MEA")), in series and interposing a separator between the unit cells. Hereinafter, the SOFC as a unit cell will be further disclosed, but it is not limited thereto.

The SOFC may be prepared as an electrolyte support type or an electrode support type. According to an embodiment, a solid oxide electrolyte material is sintered to form a solid oxide electrolyte in a pellet form having a thickness of about 100 μm, negative and positive electrode materials are coated on both surfaces of the solid oxide electrolyte, and the resulting material is heat-treated to prepare a SOFC. According to another embodiment, a solid oxide electrolyte material is coated on one surface of a negative electrode to a thickness of about 1 to about 50 μm, specifically about 5 to about 30 μm, more specifically about 10 to about 20 μm, and sintered to form a solid oxide electrolyte, and then a positive electrode material is coated on the other surface of the solid oxide electrolyte and heat-treated to prepare a SOFC.

The positive electrode material may comprise a metal oxide particle having a perovskite-type crystal structure, but is not limited thereto. The metal oxide may comprise $(Sm,Sr)CoO_3$, $(La,Sr)MnO_3$, $(La,Sr)CoO_3$, $(La,Sr)(Fe,Co)O_3$, or $(La,Sr)(Fe,Co,Ni)O_3$, or the like. One or more than two types of the metal oxide particles may be used, thus a combination comprising at least one of the foregoing can be used. An air electrode may be formed of a precious metal, such as platinum (Pt), ruthenium (Ru), or palladium (Pd). The air electrode may be formed of lanthanum manganate doped with strontium (Sr), cobalt (Co), or iron (Fe). For example, $La_{0.8}Sr_{0.2}MnO_3$ ("LSM"), or $La_{0.6}Sr_{0.4}Co_{0.8}Fe_{0.2}O_3$ ("LSCF"), or the like may be used.

The negative electrode material may comprise a cermet including a metal-doped oxide and nickel oxide, but is not limited thereto. The metal-doped oxide may be, for example, zirconia or ceria comprising yttrium (Y), scandium (Sc), ytterbium (Yb), gadolinium (Gd), samarium (Sm), indium (In), lutetium (Lu), dysprosium (Dy), lanthanum (La), bismuth (Bi), praseodymium (Pr), actinium (Ac), aluminum (Al), gallium (Ga), or boron (B), as a dopant. A combination comprising at least one of the foregoing can be used. The negative electrode material may further include activated carbon.

The solid oxide electrolyte may be prepared using the oxide disclosed above, and the oxide may be in the form of a powder comprising particles.

According to an embodiment, a SOFC may be prepared by forming a negative electrode by sintering a mixture of a YSZ powder and NiO, forming a solid oxide electrolyte by coating a surface of the negative electrode with the oxide particle powder and sintering the coating at a temperature of about 900 to about 1400° C., specifically about 1000 to about 1300° C., more specifically about 1200° C., coating the other surface of the solid oxide electrolyte with a perovskite-based oxide, and sintering the coating.

The disclosed embodiments will now be described in further detail with reference to the following examples. However, these examples shall not limit the scope of the disclosed embodiments.

Preparation of Metal Oxide Particles

Example 1

Figure 3A:
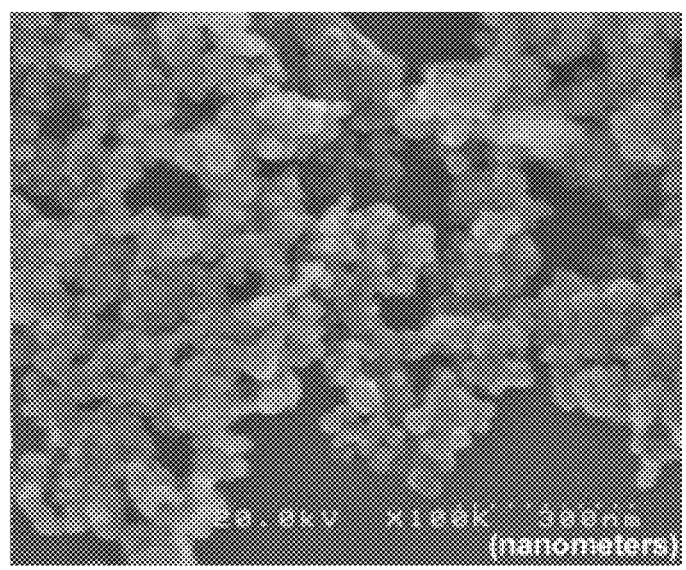
FIG. 3A is a scanning electron microscope ("SEM") image of an oxide particle powder prepared according to Example 1.

Zirconium acetate and yttrium chloride were added to 100 ml of diethylene glycol ("DEG") to a concentration of 0.01 M to have a molar ratio of Zr:Y=84:16 mol. Citric acid was added thereto such that the molar ratio between the mixture of zirconium acetate and yttrium chloride and citric acid satisfies (Zr,Y):citric acid=1:3, and NaCl was added thereto such that the molar ratio between the mixture of zirconium acetate and yttrium chloride and NaCl satisfies (Zr, Y):NaCl=1:6. Then, the mixture was sufficiently stirred at 100° C. to prepare a precursor solution. Microwaves having a power of 600 watts (W) were irradiated onto the precursor solution for about 3 to about 4 minutes, and the precursor solution was centrifuged. The centrifuged solution was heat-treated at 700° C. for 2 hours, cleaned with distilled water, and dried to prepare an oxide powder. FIG. 3A is a scanning electron microscope ("SEM") image of oxide particle powder prepared according to Example 1. Referring to FIG. 3A, it was identified that uniform particles having a diameter of about 20 to about 40 nanometers (nm) were formed. The chlorine ion content of the obtained oxide particle powder was measured by inductive coupled plasma ("ICP") analysis. The amount of chlorine ions was determined to be 0.85 wt %, based on the total weight of the oxide particle powder.

Example 2

Oxide particles were prepared in the same manner as in Example 1, except that the molar ratio satisfied (Zr, Y):NaCl=1:5. The chlorine ion content of the obtained oxide particle powder were measured using ICP. The amount of chlorine ions was determined to be 0.55 wt %, based on the total weight of the oxide particle powder.

Example 3

Oxide particles were prepared in the same manner as in Example 1, except that the molar ratio satisfied (Zr, Y):NaCl=1:10. The chlorine ion content of the obtained oxide particle powder were measured using ICP. The amount of chlorine ions was determined to be 1.56 wt %, based on the total weight of the oxide particle powder.

Example 4

Figure 3B:
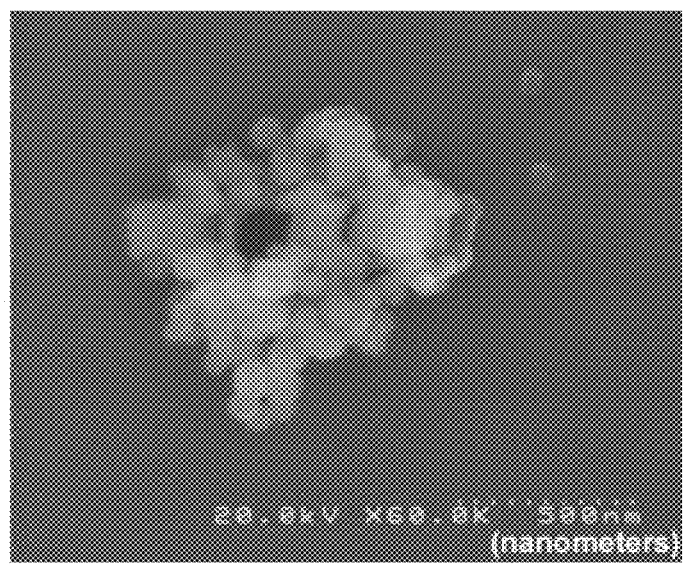
FIG. 3B is a SEM image of an oxide particle powder prepared according to Example 4.

Oxide particles were prepared in the same manner as in Example 1, except that the heat-treatment was performed at a temperature of 700° C. instead of 800° C. FIG. 3B is a SEM image of the oxide particle powder prepared according to Example 4. Referring to FIG. 3B, it was identified that uniform particles having a diameter of about 50 to about 60 nm were formed.

Example 5

Oxide particles were prepared in the same manner as in Example 1, except that the heat-treatment was performed at a temperature of 650° C. instead of 700° C.

Sintering the Metal Oxide

Example 6

Figure 4A:
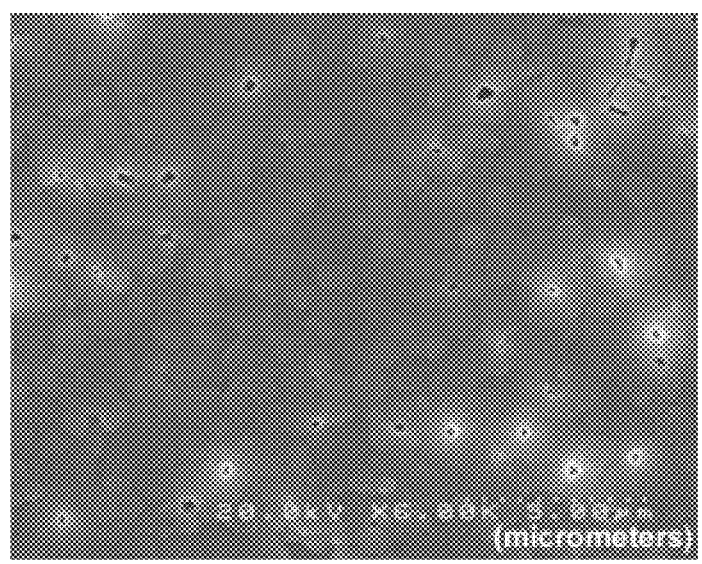
FIGS. 4A and 4B are SEM images of a cross-section of a pellet prepared according to Examples 6 and 7.

The metal oxide particle powder prepared according to Example 1 was pressed at about 25 megaPascals (MPa) using a uniaxial press to prepare a pellet having a diameter of 1 centimeter (cm) and the pellet was sintered at 1200° C. FIG. 4A is a SEM image of a cross-section of the pellet prepared according to Example 6. The pellet had a particle size distribution between 1 and 2 μm.

Example 7

Figure 4B:
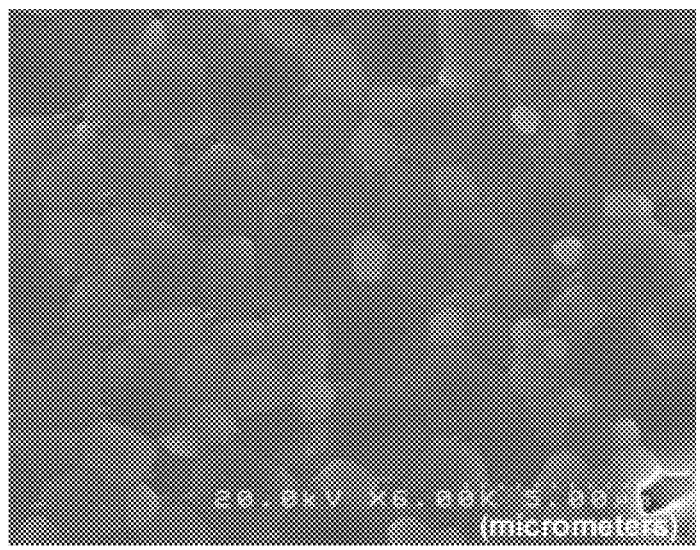

A pellet was prepared in the same manner as in Example 6, except that the metal oxide particle powder prepared according to Example 4 was used, and the pellet was sintered at 1200° C. FIG. 4B is a SEM image of a cross-section of the pellet prepared according to Example 7. The pellet had a particle size distribution between 3 and 4 μm.

Example 8

A pellet was prepared in the same manner as in Example 6, except that the metal oxide particle powder prepared according to Example 5 was used, and the pellet was sintered at 1200° C.

Example 9

A pellet was prepared in the same manner as in Example 6, except that the sintering temperature was 1000° C.

Example 10

A pellet was prepared in the same manner as in Example 6, except that the sintering temperature was 1100° C.

Example 11

A pellet was prepared in the same manner as in Example 6, except that the sintering temperature was 1300° C.

Comparative Example 1

Figure 4C:
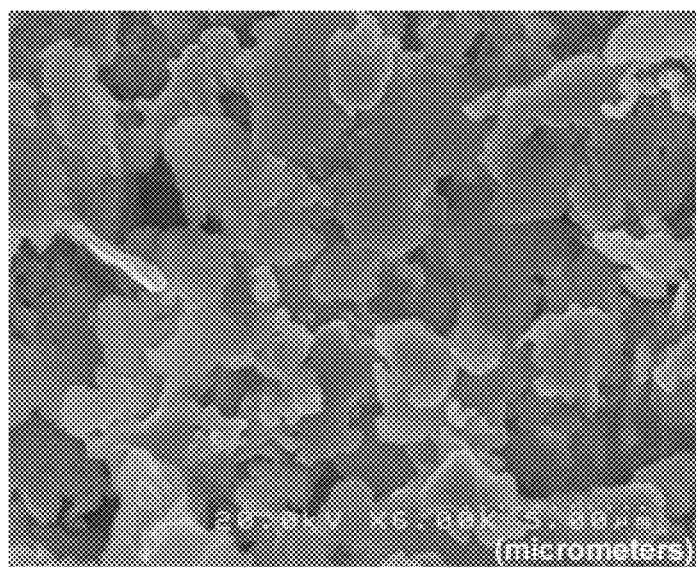
FIG. 4C is a SEM image of a cross-section of a pellet prepared according to Comparative Example 1.

A pellet was prepared in the same manner as in Example 6, except that commercially available YSZ ($Y_{0.16}Z_{0.84}O_2$) powder (Tosoh, TZ-8Y) was used, and the pellet was sintered at 1200° C. FIG. 4C is a SEM image of a cross-section of the pellet prepared according to Comparative Example 1. The pellet had a particle size distribution between 4 and 5 μm.

Comparative Examples 2 to 4

Pellets were prepared in the same manner as in Comparative Example 1, except that the pellets were heat-treated at 1000° C., 1100° C., and 1300° C., respectively.

Comparison of Relative Density

Evaluation Example 1: Comparison of Relative Density According to Sintering Temperature As shown in FIG. 5, the pellets sintered according to Examples 6, and 9-11 have higher relative density than the pellet sintered according to Comparative Examples 1 to 4 at the same sintering temperature. That is, the pellets according to Examples 6 and 9-11 may have a denser structure than commercially available pellets when sintered at the same sintering temperature.

As further disclosed above, according to an embodiment, a solid oxide electrolyte having a dense structure is provided. The solid oxide electrolyte may be prepared by sintering at a lower sintering temperature than a temperature used for a commercially available solid oxide electrolyte. The solid oxide electrolyte has high ionic conductivity, and thus performance of the SOFC including the solid oxide electrolyte may be improved.

It should be understood that the exemplary embodiments disclosed herein shall be considered in a descriptive sense only and not for purposes of limitation. Descriptions of features, advantages, or aspects of each embodiment should be considered as available for other similar features or aspects in other embodiments.

What is claimed is:

1. A method of preparing a metal-doped oxide, the method comprising:
    preparing a precursor solution comprising
        a zirconium precursor or a cerium precursor,
        a dopant metal precursor,
        a solvent, and
        a chloride salt;
    irradiating microwaves on the precursor solution; and then
    heat-treating the precursor solution to prepare the metal-doped oxide.

2. The method of claim 1, wherein the chloride salt comprises sodium, lithium, potassium, magnesium, or a combination comprising at least one of the foregoing.

3. The method of claim 1, wherein an amount of the chloride salt is about 5 to 10 moles, based on 1 mole of the dopant metal precursor and the zirconium precursor or the cerium precursor.

4. The method of claim 1, wherein the heat-treating is performed at a temperature of about 600 to about 900° C.

5. The method of claim 1, wherein the zirconium precursor comprises zirconium acetate, zirconium nitrate, or a combination comprising at least one of the foregoing, and the cerium precursor comprises cerium acetate, cerium nitrate, cerium chloride, or a combination comprising at least one of the foregoing.

6. The method of claim 1, wherein the dopant metal precursor comprises yttrium, scandium, ytterbium, gadolinium, samarium, indium, lutetium, dysprosium, lanthanum, bismuth, praseodymium, actinium, aluminum, gallium, boron, or a combination comprising at least one of the foregoing.

7. The method of claim 1, wherein the precursor solution further comprises a precipitant.

8. The method of claim 7, wherein the precipitant comprises at least one of urea, citric acid, tartaric acid, oxalic acid, hexadecanediol, an ammonia aqueous solution, a hydrazine ($NH_2NH_2$) aqueous solution, acetic acid, sodium acetate, ammonium acetate, oleic acid, sodium oleate, ammonium oleate, ammonium succinate, polyacrylate, glycine, acyl glutamate, or a combination comprising at least one of the foregoing.

9. The method of claim 1, wherein the irradiating microwaves on the precursor solution comprises irradiating with microwaves having a power of about 100 Watts to about 2000 Watts for a time of about 1 minute to about 20 minutes.

* * * * *